United States Patent
Hatanaka et al.

(10) Patent No.: US 10,195,899 B2
(45) Date of Patent: *Feb. 5, 2019

(54) PNEUMATIC RADIAL TIRE FOR A PASSENGER VEHICLE AND METHOD OF USING THE TIRE

(75) Inventors: Shintaro Hatanaka, Kodaira (JP); Hiroyuki Matsumoto, Kodaira (JP); Isao Kuwayama, Kodaira (JP); Jun Watanabe, Kokubunji (JP); Shingo Hiura, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 222 days.

This patent is subject to a terminal disclaimer.

(21) Appl. No.: 14/235,262

(22) PCT Filed: Jul. 27, 2012

(86) PCT No.: PCT/JP2012/004820
§ 371 (c)(1),
(2), (4) Date: Jan. 27, 2014

(87) PCT Pub. No.: WO2013/014950
PCT Pub. Date: Jan. 31, 2013

(65) Prior Publication Data
US 2014/0158263 A1 Jun. 12, 2014

(30) Foreign Application Priority Data

Jul. 28, 2011 (JP) .................................. 2011-166038

(51) Int. Cl.
*B60C 3/00* (2006.01)
*B60C 11/03* (2006.01)
(Continued)

(52) U.S. Cl.
CPC ................... *B60C 3/00* (2013.01); *B60C 3/04* (2013.01); *B60C 11/033* (2013.01); *B60C 9/28* (2013.01);
(Continued)

(58) Field of Classification Search
CPC ......... B60C 3/00; B60C 3/04; B60C 11/0304; B60C 11/04; B60C 11/042;
(Continued)

(56) References Cited

U.S. PATENT DOCUMENTS 3,628,587 A * 12/1971 O'Neil .................. B60C 9/2006
152/527
3,739,828 A * 6/1973 Schaevitz ........... B60C 11/0309
152/209.12
(Continued)

FOREIGN PATENT DOCUMENTS

BG 61716 B1 4/1998
CN 1647956 A 8/2005
(Continued)

OTHER PUBLICATIONS

600R16 Coker Classic Blackwall Tire as accessed on the Internet Archive at http://web.archive.org/web/20081004230735/http://store.coker.com/600r16-coker-classic-blackwall-tire.html showing the page as of Oct. 4, 2008.*
(Continued)

*Primary Examiner* — Justin R Fischer
*Assistant Examiner* — Philip N Schwartz
(74) *Attorney, Agent, or Firm* — Sughrue Mion, PLLC (57) ABSTRACT

Provided is a pneumatic radial tire for a passenger vehicle, having a carcass constituted of plies as radially-disposed cords and toroidally provided across a pair of bead portions, and including: a belt constituted of one or more belt layers; and a tread, which are disposed in this order on the outside
(Continued)

in the radial direction of the carcass, in which: a section width SW and an outer diameter OD of the tire have a ratio of SW/OD≤0.26 when SW<165 (mm), and SW and OD satisfy a relationship formula OD≥2.035×SW+282.3 when SW≥165 (mm); and provided that V1 represents a volume of rubber lying inside in the tire width direction than the both ends in the width direction of a maximum-width belt layer having a maximum width in the tire width direction among the belt layers while lying outside in the tire radial direction than the reinforcing member which is the outermost layer of the belt layers in the tire radial direction at the center position in the tire width direction, and that V2 represents a total volume of all the grooves formed in a surface of the tread, V1 and V2 has a ratio V2/V1≤20%.

15 Claims, 6 Drawing Sheets

(51) Int. Cl.
  *B60C 3/04* (2006.01)
  *B60C 9/28* (2006.01)
  *B60C 11/00* (2006.01)
(52) U.S. Cl.
  CPC ....... *B60C 11/03* (2013.01); *B60C 2011/0033* (2013.01); *B60C 2011/0355* (2013.01)
(58) Field of Classification Search
  CPC ... B60C 11/0332; B60C 11/03; B60C 11/033; B60C 2011/0341; B60C 2011/0344; B60C 2011/0348; B60C 2011/0351; B60C 2011/0353; B60C 2011/0355; B60C 2011/0358; B60C 2011/036; B60C 2011/0362; B60C 2011/0365; B60C 2011/0369; B60C 2011/0372; B60C 2011/0381; B60C 2011/0383; B60C 9/00; B60C 9/28
  See application file for complete search history.

(56) References Cited

U.S. PATENT DOCUMENTS

| | | | |
|---|---|---|---|
| 3,786,851 A | 1/1974 | Mirtain et al. | |
| 4,385,653 A * | 5/1983 | Okazaki | B60C 11/00 152/209.5 |
| 4,418,735 A | 12/1983 | Musy | |
| 5,882,450 A | 3/1999 | Benchea | |
| 6,481,479 B1 | 11/2002 | Weed et al. | |
| 6,568,444 B1 * | 5/2003 | Kaneko | B60C 3/04 152/209.18 |

FOREIGN PATENT DOCUMENTS

| | | |
|---|---|---|
| CN | 1907738 A | 2/2007 |
| EP | 0370699 A2 | 5/1990 |
| FR | 2499473 A1 | 8/1982 |
| FR | 2719525 A1 | 11/1995 |
| JP | 53040903 A | 4/1978 |
| JP | 3-213404 A | 9/1991 |
| JP | 7-40706 A | 2/1995 |
| JP | 7-69008 A | 3/1995 |
| JP | 8-164709 A | 6/1996 |
| JP | 10-315346 A | 12/1998 |
| JP | 2000-190706 A | 7/2000 |
| JP | 2006-232025 A | 9/2006 |
| JP | 2008-13037 A | 1/2008 |
| JP | 2008-254670 A | 10/2008 |
| JP | 2009-137315 A | 6/2009 |
| JP | 2010-47191 A | 3/2010 |

OTHER PUBLICATIONS

Coker Classic Radial 600R16—Blackwall Tire as accessed at http://www.tiresandwires.com/Coker-Classic-Radial-600R16--Blackwall-Tire_p_69.html on Jan. 11, 2015.*
Machine translation of JP2000-190706 (no date).*
Machine translation of JP03-213404 (no date).*
05-07 Cadillac STS Factory Goodyear T145/70R17 Spare Wheel Tire OEM V8 as accessed from http://www.ebay.com/itm/05-07-Cadillac-STS-Factory-Goodyear-T145-70R17-Spare-Wheel-Tire-OEM-V8-/172734714482 on Aug. 14, 2017.*
Spare tyre wheel T165/70D16 Toyota Celica ZZ T23 Coupe 1.8 16V VT-i Yr 99-02 as accessed from http://www.ebay.com/itm/Spare-tyre-wheel-T165-70D16-Toyota-Celica-ZZ-T23-Coupe-1-8-16V-Vt-i-Yr-99-02-/381718694058 on Aug. 17, 2017.*
Communication dated Jul. 31, 2015 from the State Intellectual Property Office of the People's Republic of China issued in corresponding Chinese application No. 201280037696.4.
Communication dated Nov. 11, 2014 from the Japanese Patent Office in counterpart application No. 2013-525589.
Communication dated Mar. 12, 2015 from the European Patent Office in counterpart application No. 12817199.8.
Longstone Tyres: "Michelin X | Longstone Tyres," longstonetyres.co.uk, Feb. 24, 2015, XP055171745, Retrieved on Feb. 24, 2015 from the Internet: URL:http://www.longstonetyres.co.uk/page/michelin-x.
"Michelin X", laventuremichelin.com, Originally in 1950: Michelin, Mar. 24, 2010, XP055171753 Retrieved on Feb. 24, 2015 from the Internet: URL: http://www.laventurenichelin.com/scolaires_et_enseignants/DOCS/radial_small.jpg.
Communication dated Mar. 17, 2015, issued by the Japanese Patent Office in counterpart Application No. 2013525589.
International Search Report of PCT/JP2012/004820, dated Oct. 30, 2012.
Non Final Office Action dated Jun. 7, 2017 issue in U.S. Appl. No. 14/355,738.
"Citron 2CV Longstone Tyres", longstonetyes.co.uk, Longstone Tyres, Feb. 24, 2015, XP055171748, retrieved on Feb. 24, 2015 from the Internet: URL: http:www.longstonetyres.co.uk/pahe/citroen-2cv; total 4 pages.

* cited by examiner

FIG. 1A
WIDE-WIDTH CONTACT SHAPE

FIG. 1B
NARROW-WIDTH CONTACT SHAPE

PNEUMATIC RADIAL TIRE FOR A PASSENGER VEHICLE AND METHOD OF USING THE TIRE

CROSS REFERENCE TO RELATED APPLICATIONS

This application is a National Stage of International Application No. PCT/JP2012/004820 filed Jul. 27, 2012, claiming priority based on Japanese Patent Application No. 2011-166038, filed Jul. 28, 2011, the contents of all of which are incorporated herein by reference in their entirety.

TECHNICAL FIELD

The present invention relates to a pneumatic radial tire for a passenger vehicle and a method of using the tire.

BACKGROUND ART

Bias tires having relatively narrower sectional widths had been predominantly used in vehicles until around 1960 because vehicles in those days were relatively lightweight, and the speed demanded for the vehicles were lower, resulting a less burden imposed on the tires. However, radial tires are predominant these days and those having larger widths and assuming flat shapes are particularly demanded due to increase in weight and speed of vehicles (see, for example, PTL 1).

However, the larger tire width sacrifices the vehicle space and thus will degrade comfortability. Further, the larger tire widths increase air resistance and cause another problem of poor fuel consumption, despite the fact that there has been an increasing demand for lower fuel consumption along with increased interest in environmental issues.

In particular, electric vehicles, which are being developed for use in future, need to ensure a sufficient space for accommodating driving components such as a motor for controlling the torque for rotating tires around drive shafts. Ensuring a sufficient space around the tire is also becoming increasingly important in this connection.

Figure 1A:
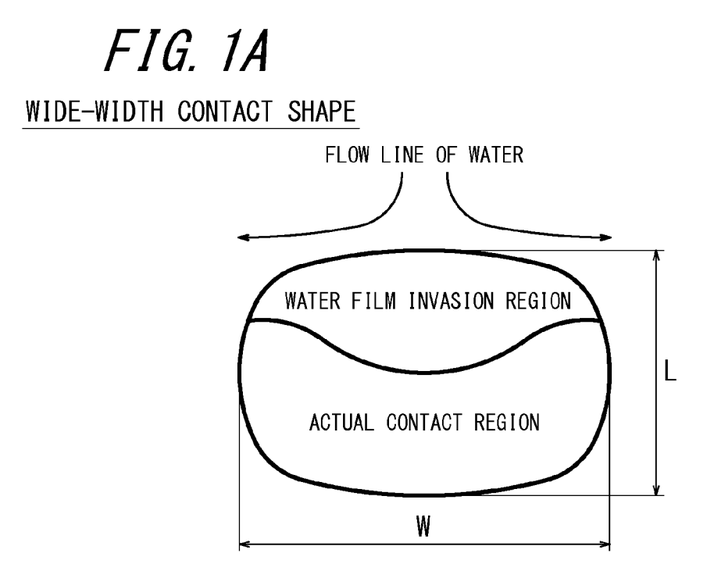
FIG. 1A is a view for illustrating the wet performance of a wide-width radial tire.

Further, the aforementioned wide-width flat-shaped tire has a treading surface with a wide width, which makes it difficult to laterally discharge water toward both sides during driving in rain, as illustrated in FIG. 1A schematically showing the flow line of the water by an arrow, which leads to poor drainage. Further, the wide-width flat-shaped tire has a small contact length L, which is likely to cause a so-called hydroplaning phenomenon in which, as illustrated in FIG. 1A, the tread surface is uplifted due to the water film entered from the treading surface, with the result that the actual contact area is reduced to lose grip, causing a problem of degradation in wet performance.

In view of the above, particularly in a wide-width flat-shaped radial tire, it has been hitherto necessary to dispose, in the tread surface, a main groove that has a large sectional area and extends in the tread circumferential direction.

However, when disposing a main groove having a large groove depth, it is necessary to increase the thickness of the tread correspondingly to the large depth of the main groove, which causes a problem of increase in tire weight and deterioration in driving performance. Further, providing the main groove having a large groove width incurs an increase in negative ratio, which reduces a contact area, causing a problem of deterioration in grip force, that is, deterioration in driving stability and braking performance on a dry road surface, and further, degradation in wear resistance and noise performance.

Further, it is known to be effective to use, in a wide-width flat-shaped radial tire, tread rubber of a small hysteresis loss for the purpose of reducing rolling resistance so as to attain low fuel consumption. However, the use of rubber of a small hysteresis loss incurs a problem of impaired grip performance on a wet road surface.

CITATION LIST

Patent Literature

PTL 1: JP H7-40706 A

SUMMARY OF INVENTION

Technical Problem

As described above, it is generally difficult obtain low fuel consumption of the tire, the comfortability (space in the vehicle), the wet performance, and the dry performance in a compatible manner, and there has been a strong desire for a drastic technology capable of improving the performance altogether.

Thus, the present invention aims at solving the problems described above and an object thereof is to provide a pneumatic radial tire for a passenger vehicle and a method of using the tire, the tire being low in both air resistance value (Cd value) and the tire rolling resistance value (RR value) and capable of achieving low fuel consumption and ensuring a space in the vehicle, while having excellent driving performance on a dry road surface and excellent driving performance on a wet road surface.

Solution to Problem

The inventors of the present invention keenly studied to solve the aforementioned problems.

As a result, the inventors have found out that it is extremely effective to control the reduction in width and the increase in diameter of the tire, namely, to define the tire section width SW and the tire outer diameter OD so as to fall under an appropriate ratio.

Further, the inventors of the present invention have also obtained novel findings that a groove area may be defined properly in the aforementioned tire with a smaller width and a larger diameter, which even makes it possible to ensure driving performance both on a dry road surface and on a wet road surface in a compatible manner.

The present invention has been contrived based on the aforementioned discovery and main structural features are as follows.

(1) A pneumatic radial tire for a passenger vehicle, having a carcass constituted of plies as radially-disposed cords and toroidally provided across a pair of bead portions, and including: a belt including one or more belt layers; and a tread, which are disposed in this order on the outside in the radial direction of the carcass, in which, provided that SW and OD each represent a section width and an outer diameter of the tire, respectively, SW and OD satisfy a ratio SW/OD≤0.26 when SW<165 (mm), and SW and OD satisfy a relationship formula OD≥2.135×SW+282.3 when SW≥165 (mm), in which, provided that V1 represents a volume of rubber lying inside in the tire width direction than the both ends in the width direction of a maximum-width belt layer having a maximum width in the tire width direction among the belt layers while lying outside in the tire radial direction than a reinforcing member which is the outermost layer of the belt layers in the tire radial direction at the center position in the tire width direction, and that V2 represents a total volume of all the grooves formed in a surface of the tread, the ratio V2/V1 is 20% of less.

(2) A pneumatic radial tire for a passenger vehicle, having a carcass constituted of plies as radially-disposed cords and toroidally provided across a pair of bead portions, and including: a belt including one or more belt layers; and a tread, which are disposed in this order on the outside in the radial direction of the carcass, in which, provided that SW and OD each represent a section width and an outer diameter of the tire, respectively, SW and OD satisfy a relationship formula $OD \geq -0.0187 \times SW^2 + 9.15 \times SW - 380$, in which, provided that V1 represents a volume of rubber lying inside in the tire width direction than the both ends in the width direction of a maximum-width belt layer having a maximum width in the tire width direction among the belt layers while lying outside in the tire radial direction than the reinforcing member which is the outermost layer of the belt layers in the tire radial direction at the center position in the tire width direction, and that V2 represents a total volume of all the grooves formed in a surface of the tread, the ratio V2/V1 is 20% of less.

(3) The pneumatic radial tire for a passenger vehicle according to (1) or (2) above, in which the tread surface has a negative ratio of 20% or less.

(4) The pneumatic radial tire for a passenger vehicle according to any one of (1) to (3) above, in which, provided that δg represents a groove depth of the groove in a tire equator plane and δt represents a thickness of the tread rubber in the tire equator plane from the tread surface to the reinforcing member on the outermost side in the tire radial direction, δg and δt satisfy δg/δt≤0.85.

(5) The pneumatic radial tire for a passenger vehicle according to any one of (1) to (4) above, in which the ratio SW/OD is 0.24 or less.

(6) A method of using a pneumatic radial tire for a passenger vehicle, including using the pneumatic radial tire for a passenger vehicle according to any one of (1) to (5) above at an internal pressure of at least 250 kPa.

Advantageous Effect of Invention

According to the present invention, it is possible to provide a pneumatic radial tire for a passenger vehicle and a method of using the tire, the tire being low in both air resistance value (Cd value) and the tire rolling resistance value (RR value) and capable of achieving low fuel consumption and ensuring a space in the vehicle, while having excellent driving performance on a dry road surface and excellent driving performance on a wet road surface.

BRIEF DESCRIPTION OF DRAWINGS

The present invention will be further described below with reference to the accompanying drawings, wherein.

DESCRIPTION OF EMBODIMENTS

In the following, how a pneumatic radial tire for a passenger vehicle of the present invention (which tire will also be referred to simply as "tire" hereinafter) has been realized is described.

Figure 2:
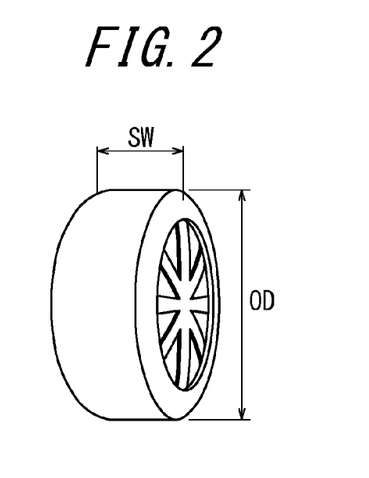
FIG. 2 is a view showing a section width SW and an outer diameter OD of a tire.
Figure 3A:
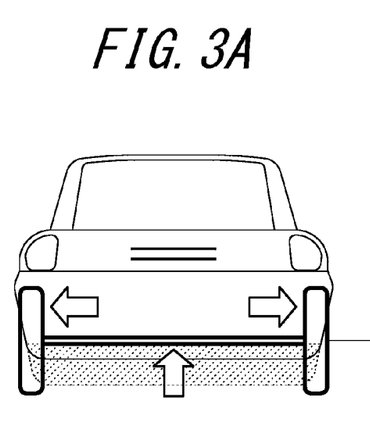
FIG. 3A is a view showing a vehicle on which the tires increased in diameter and reduced in width of the present invention are mounted.
Figure 3B:
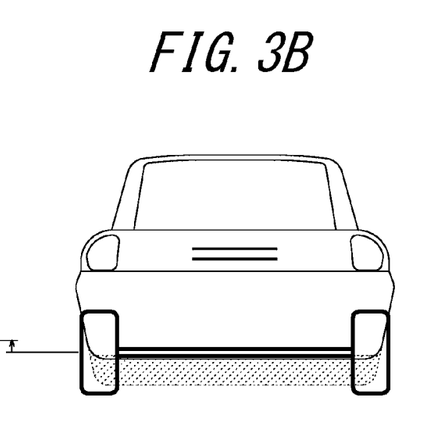
FIG. 3B is a view showing a vehicle on which conventional tires are mounted.

First, the inventors of the present invention turned their attention to the fact that narrowing the tire section width SW (see FIG. 2) of a radial tire as compared with a conventional tire allows a vehicle to ensure sufficient space therein, in particular, space for accommodating driving units in the vicinity, on the vehicle inner side, of the tire (see FIG. 3)

Further, narrowing the tire section width SW reduces an area of the tire viewed from the front (hereinafter, the area is referred to as frontal projected area), which produces an effect of reducing an air resistance value (Cd value) of the vehicle.

However, the contact portion suffers larger deformation, which leads to a problem of a larger rolling resistance value (RR value) under the same air pressure.

Meanwhile, the inventors discovered that the properties inherent to radial tires would solve the aforementioned problems. Specifically, the inventors turned their attention to the fact that radial tires are smaller in tread deformation as compared to bias tires, and thus the outer diameter OD of the radial tire can be increased than conventionally so as to be less susceptible to road surface roughness, which allows for reduction of the rolling resistance value (RR value) under the same air pressure. Further, the increase of the tire diameter also allows for improvement in the load capacity of the tire. Still further, as illustrated in FIG. 3, the larger outer diameter of the radial tire increases the height of drive shafts, which enlarges under-chassis space, allowing the vehicle to ensure wide spaces for a car trunk, driving units and the like.

Here, the narrowed width and the increased outer diameter of the tire are both effective in ensuring free space in a vehicle, while having a tradeoff relation against the rolling resistance value (RR value). Further, the narrowed width of the tire allows for reduction of the air resistance value (Cd value) of the vehicle.

In view of the above, the inventors have made extensive study on optimizing the balance between the tire section width and the tire outer diameter so as to improve properties in relation to the air resistance value (Cd value) and the rolling resistance value (RR value) of the tire as compared to those of the conventional radial tires.

The inventors turned their attention to the relation between the tire section width SW and the tire outer diameter OD, and derived conditions to be satisfied by the SW and the OD of the tire when the properties in relation to the air resistance value (Cd value) and the rolling resistance value (RR) both became more excellent than those of the conventional radial tires, by testing the tires in the following manner. That is, tires in various sizes including those beyond the conventional sizes were each mounted onto a vehicle to measure the air resistance value (Cd value) and the rolling resistance value (RR value).

In the following, a detailed description is given of the experimental results which led to derivation of an optimal relation between SW and OD.

On the basis of the discoveries described above, the inventors of the present invention studied specific conditions under which both the air resistance value and the rolling resistance value can be reduced in a compatible manner by increasing outer diameter and narrowing width of the tire.

First, there was prepared as Reference tire 1 a tire with a size of 195/65R15, which tire is used in the most common types of vehicles and thus suitable for comparison of tire performances. Then, prepared as Reference Tire 2 was a tire with a size of 225/45R17, which is an inch larger than Reference Tire 1.

Further, tires in various sizes (Example Tires 1 to 52) were prepared, which were each assembled with a rim and subjected to the following tests.

Figure 4A:
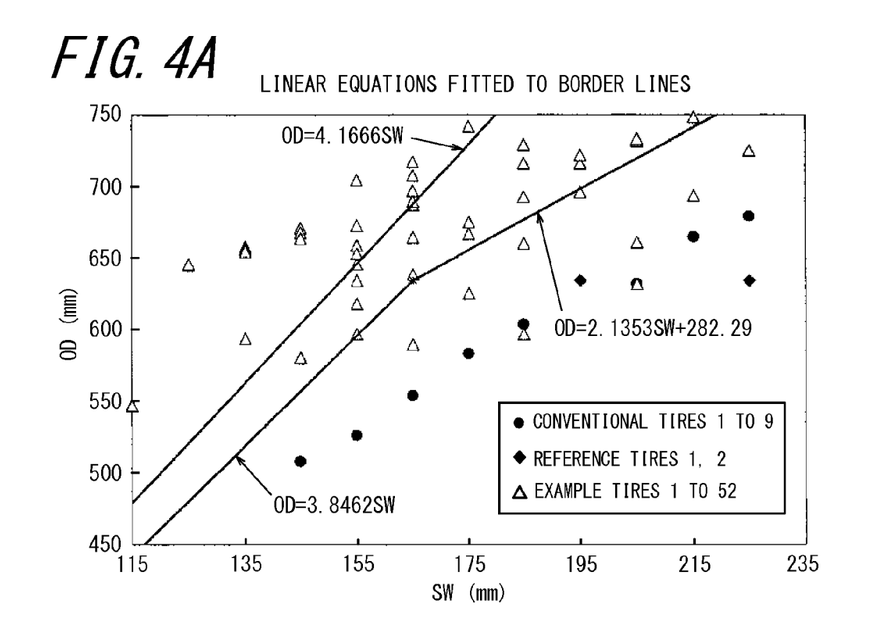
FIGS. 4A and 4B each are a graph showing a relation between SW and OD in Example Tires and Conventional Tires, respectively.
Figure 4B:
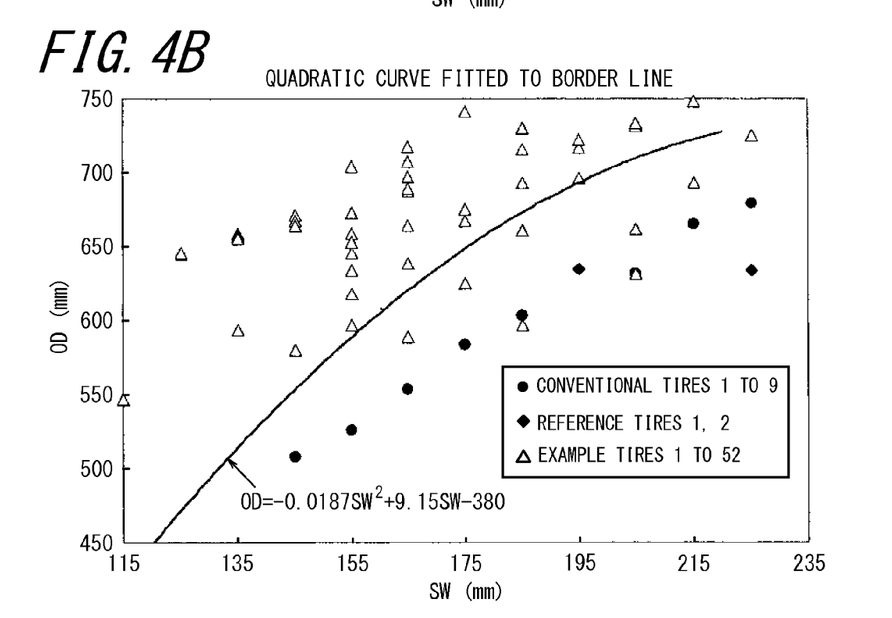

Table 1 and FIG. 4 show relevant specifications of the respective test tires. Other specifications of each tire than those shown in Table 1 (e.g. internal structures thereof) were the same as those of a tire commonly in use. Each of the test tires included a carcass constituted of plies as radially-disposed cords and toroidally provided across a pair of bead portions.

With regard to the tire size, a variety of tire sizes including the conventional sizes prescribed in JATMA, TRA, ETRTO and the like and those beyond these conventional sizes were widely studied.

TABLE 1

|  | Tire Size | SW (mm) | OD (mm) | SW/OD |
|---|---|---|---|---|
| Conventional Tire 1 | 145/70R12 | 145 | 507.8 | 0.29 |
| Conventional Tire 2 | 155/55R14 | 155 | 526.1 | 0.29 |
| Conventional Tire 3 | 165/60R14 | 165 | 553.6 | 0.30 |
| Conventional Tire 4 | 175/65R14 | 175 | 583.1 | 0.30 |
| Conventional Tire 5 | 185/60R15 | 185 | 603 | 0.31 |
| Conventional Tire 6 | 205/55R16 | 205 | 631.9 | 0.32 |
| Conventional Tire 7 | 215/60R16 | 215 | 664.4 | 0.32 |
| Conventional Tire 8 | 225/55R17 | 225 | 679.3 | 0.33 |
| Conventional Tire 9 | 245/45R18 | 245 | 677.7 | 0.36 |
| Reference Tire 1 | 195/65R15 | 195 | 634.5 | 0.31 |
| Reference Tire 2 | 225/45R17 | 225 | 634.3 | 0.35 |
| Example Tire 1 | 155/55R21 | 155 | 704.5 | 0.22 |
| Example Tire 2 | 165/55R21 | 165 | 717.4 | 0.23 |
| Example Tire 3 | 155/55R19 | 155 | 653.1 | 0.24 |
| Example Tire 4 | 155/70R17 | 155 | 645.8 | 0.24 |
| Example Tire 5 | 165/55R20 | 165 | 689.5 | 0.24 |
| Example Tire 6 | 165/65R19 | 165 | 697.1 | 0.24 |
| Example Tire 7 | 165/70R18 | 165 | 687.5 | 0.24 |
| Example Tire 8 | 165/55R16 | 165 | 589.3 | 0.28 |
| Example Tire 9 | 175/65R15 | 175 | 625.0 | 0.28 |
| Example Tire 10 | 185/60R17 | 185 | 660.7 | 0.28 |
| Example Tire 11 | 195/65R17 | 195 | 696.4 | 0.28 |
| Example Tire 12 | 205/60R18 | 205 | 732.1 | 0.28 |
| Example Tire 13 | 185/50R16 | 185 | 596.8 | 0.31 |
| Example Tire 14 | 205/60R16 | 205 | 661.3 | 0.31 |
| Example Tire 15 | 215/60R17 | 215 | 693.5 | 0.31 |
| Example Tire 16 | 225/65R17 | 225 | 725.8 | 0.31 |
| Example Tire 17 | 155/45R21 | 155 | 672.9 | 0.23 |
| Example Tire 18 | 205/55R20 | 205 | 631.9 | 0.32 |
| Example Tire 19 | 165/65R19 | 165 | 697.1 | 0.24 |
| Example Tire 20 | 155/65R18 | 155 | 658.7 | 0.24 |
| Example Tire 21 | 145/65R19 | 145 | 671.1 | 0.22 |
| Example Tire 22 | 135/65R19 | 135 | 658.1 | 0.21 |
| Example Tire 23 | 125/65R19 | 125 | 645.1 | 0.19 |
| Example Tire 24 | 175/55R22 | 175 | 751.3 | 0.23 |
| Example Tire 25 | 165/55R20 | 165 | 689.5 | 0.24 |
| Example Tire 26 | 155/55R19 | 155 | 653.1 | 0.24 |
| Example Tire 27 | 145/55R20 | 145 | 667.5 | 0.22 |
| Example Tire 28 | 135/55R20 | 135 | 656.5 | 0.21 |
| Example Tire 29 | 125/55R20 | 125 | 645.5 | 0.19 |
| Example Tire 30 | 175/45R23 | 175 | 741.7 | 0.24 |
| Example Tire 31 | 165/45R22 | 165 | 707.3 | 0.23 |

TABLE 1-continued

|  | Tire Size | SW (mm) | OD (mm) | SW/OD |
|---|---|---|---|---|
| Example Tire 32 | 155/45R21 | 155 | 672.9 | 0.23 |
| Example Tire 33 | 145/45R21 | 145 | 663.9 | 0.22 |
| Example Tire 34 | 135/45R21 | 135 | 654.9 | 0.21 |
| Example Tire 35 | 145/60R16 | 145 | 580.4 | 0.25 |
| Example Tire 36 | 155/60R17 | 155 | 617.8 | 0.25 |
| Example Tire 37 | 165/55R19 | 165 | 664.1 | 0.25 |
| Example Tire 38 | 155/45R18 | 155 | 596.7 | 0.26 |
| Example Tire 39 | 165/55R18 | 165 | 638.7 | 0.26 |
| Example Tire 40 | 175/55R19 | 175 | 675.1 | 0.26 |
| Example Tire 41 | 115/50R17 | 115 | 546.8 | 0.21 |
| Example Tire 42 | 105/50R16 | 105 | 511.4 | 0.21 |
| Example Tire 43 | 135/60R17 | 135 | 593.8 | 0.23 |
| Example Tire 44 | 185/60R20 | 185 | 730 | 0.25 |
| Example Tire 45 | 185/50R20 | 185 | 693.0 | 0.27 |
| Example Tire 46 | 195/60R19 | 195 | 716.6 | 0.27 |
| Example Tire 47 | 175/60R18 | 175 | 667.2 | 0.26 |
| Example Tire 48 | 195/55R20 | 195 | 722.5 | 0.27 |
| Example Tire 49 | 215/50R21 | 215 | 748.4 | 0.29 |
| Example Tire 50 | 205/55R20 | 205 | 733.5 | 0.28 |
| Example Tire 51 | 185/45R22 | 185 | 716.3 | 0.26 |
| Example Tire 52 | 155/65R13 | 155 | 634.3 | 0.29 |

<Air Resistance Value>

In a laboratory, each of the aforementioned test tires with the tire internal pressures of those in Table 2 was mounted to a vehicle with a displacement of 1500 cc, and then the vehicle was blown with air at a rate corresponding to 100 km/h so as to measure an aerodynamic force with the use of a scale placed on a floor below the wheel, to thereby measure air resistance. The evaluation results are shown as index values relative to "100" of Reference Tire 1. The smaller index value represents the air resistance.

<Rolling Resistance Value>

Rolling resistance was measured by: assembling each of the aforementioned test tires with a rim to obtain a tire-rim assembly; applying, on the tire-rim assembly, the maximum load prescribed for a vehicle on which the tire is mounted; and running the tire at drum rotation speed of 100 km/h.

Here, the "maximum load prescribed for a vehicle on which the tire is mounted" represents the largest load value among respective four load values exerted on the four tires of the passenger vehicle when the prescribed upper limit number of occupants ride in the passenger vehicle.

The evaluation results are shown as index values relative to "100" of Reference Tire. The smaller index value represents the smaller rolling resistance.

Figure 5:
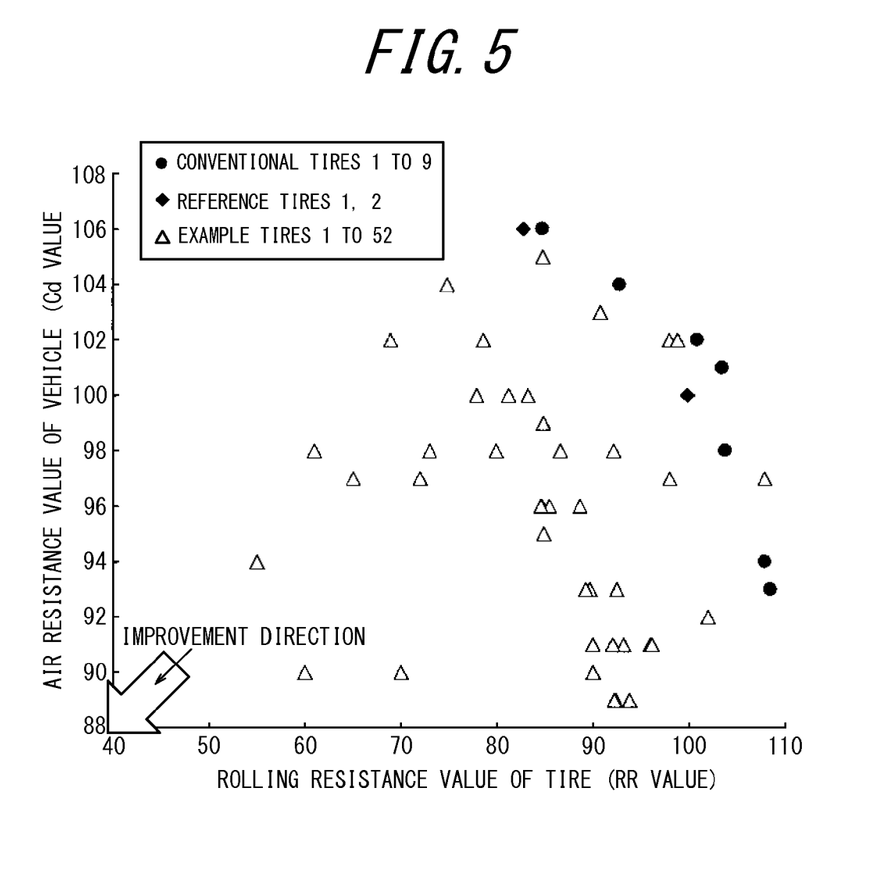
FIG. 5 is a graph showing a relation between the rolling resistance and the air resistance in each tire.
Figure 6A:
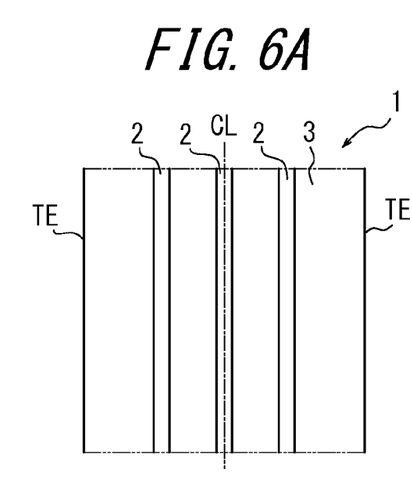
FIGS. 6A to 6D each are a development view illustrating part of a tread pattern of a tire according to an embodiment of the present invention.
Figure 6B:
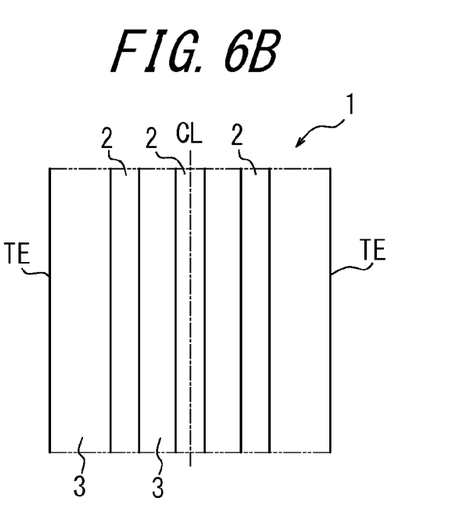
Figure 6C:
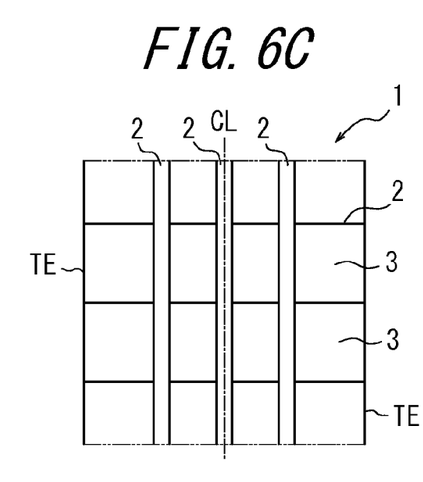
Figure 6D:
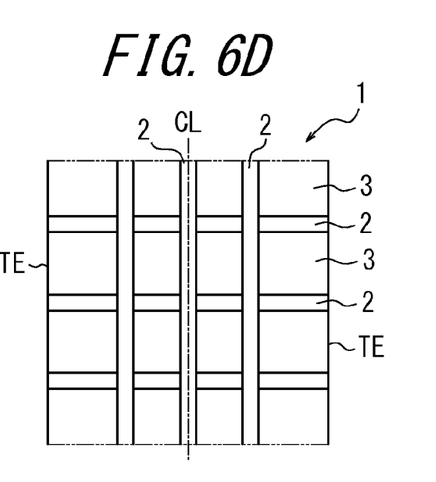

The evaluation results of air resistance and rolling resistance are shown in Tables 2, and FIGS. 4 and 5. In FIG. 4, tires that saw sufficient effects of reducing rolling resistance and air resistance are rendered as white marks, while tires insufficient in those effects are rendered as black marks.

TABLE 2

|  | Tire Size | Internal Pressure (kPa) | RR Value (INDEX) | Cd Value (INDEX) |
|---|---|---|---|---|
| Conventional Tire 1 | 145/70R12 | 295 | 108 | 94 |
| Conventional Tire 2 | 155/55R14 | 275 | 111.3 | 91 |
| Conventional Tire 3 | 165/60R14 | 260 | 108.6 | 93 |
| Conventional Tire 4 | 175/65R14 | 245 | 103.6 | 101 |
| Conventional Tire 5 | 185/60R15 | 230 | 103.9 | 98 |
| Conventional Tire 6 | 205/55R16 | 220 | 101 | 102 |
| Conventional Tire 7 | 215/60R16 | 220 | 93 | 104 |
| Conventional Tire 8 | 225/55R17 | 220 | 85 | 106 |
| Conventional Tire 9 | 245/45R18 | 220 | 80 | 111 |
| Reference Tire 1 | 195/65R15 | 220 | 100 | 100 |
| Reference Tire 2 | 225/45R17 | 220 | 83 | 106 |

TABLE 2-continued

| Tire Size | Internal Pressure (kPa) | RR Value (INDEX) | Cd Value (INDEX) |
|---|---|---|---|
| Example Tire 1 | 155/55R21 | 220 | 60 | 90 |
| Example Tire 2 | 165/55R21 | 220 | 55 | 94 |
| Example Tire 3 | 155/55R19 | 220 | 90 | 90 |
| Example Tire 4 | 155/70R17 | 220 | 85 | 95 |
| Example Tire 5 | 165/55R20 | 220 | 72 | 97 |
| Example Tire 6 | 165/65R19 | 220 | 65 | 97 |
| Example Tire 7 | 165/70R18 | 220 | 61 | 98 |
| Example Tire 8 | 165/55R16 | 220 | 102 | 92 |
| Example Tire 9 | 175/65R15 | 220 | 98 | 97 |
| Example Tire 10 | 185/60R17 | 220 | 85 | 99 |
| Example Tire 11 | 195/65R17 | 220 | 78 | 100 |
| Example Tire 12 | 205/60R18 | 220 | 69 | 102 |
| Example Tire 13 | 185/50R16 | 220 | 108 | 97 |
| Example Tire 14 | 205/60R16 | 220 | 98 | 102 |
| Example Tire 15 | 215/60R17 | 220 | 91 | 103 |
| Example Tire 16 | 225/65R17 | 220 | 85 | 105 |
| Example Tire 17 | 155/45R21 | 220 | 70 | 90 |
| Example Tire 18 | 205/55R16 | 220 | 99 | 102 |
| Example Tire 19 | 165/65R19 | 260 | 92.2 | 98 |
| Example Tire 20 | 155/65R18 | 275 | 96 | 91 |
| Example Tire 21 | 145/65R19 | 295 | 92.4 | 89 |
| Example Tire 22 | 135/65R19 | 315 | 91.6 | 87 |
| Example Tire 23 | 125/65R19 | 340 | 88.2 | 85 |
| Example Tire 24 | 175/55R22 | 345 | 84.8 | 96 |
| Example Tire 25 | 165/55R20 | 260 | 92.6 | 93 |
| Example Tire 26 | 155/55R19 | 275 | 96.2 | 91 |
| Example Tire 27 | 145/55R20 | 290 | 92.3 | 89 |
| Example Tire 28 | 135/55R20 | 310 | 92.4 | 87 |
| Example Tire 29 | 125/55R20 | 340 | 87.7 | 85 |
| Example Tire 30 | 175/45R23 | 250 | 85.5 | 96 |
| Example Tire 31 | 165/45R22 | 255 | 89.7 | 93 |
| Example Tire 32 | 155/45R21 | 270 | 93.2 | 91 |
| Example Tire 33 | 145/45R21 | 290 | 92.2 | 89 |
| Example Tire 34 | 135/45R21 | 310 | 92.1 | 87 |
| Example Tire 35 | 145/60R16 | 290 | 93.9 | 89 |
| Example Tire 36 | 155/60R17 | 270 | 92.1 | 91 |
| Example Tire 37 | 165/55R19 | 255 | 89.4 | 93 |
| Example Tire 38 | 155/45R18 | 270 | 92.1 | 91 |
| Example Tire 39 | 165/55R18 | 255 | 89.4 | 93 |
| Example Tire 40 | 175/55R19 | 250 | 88.7 | 96 |
| Example Tire 41 | 115/50R17 | 350 | 86.7 | 83 |
| Example Tire 42 | 105/50R16 | 350 | 94.1 | 80 |
| Example Tire 43 | 135/60R17 | 300 | 85.6 | 87 |
| Example Tire 44 | 185/60R20 | 270 | 73.0 | 98 |
| Example Tire 45 | 185/50R20 | 270 | 80.0 | 98 |
| Example Tire 46 | 195/60R19 | 258 | 81.3 | 100 |
| Example Tire 47 | 175/60R18 | 286 | 84.7 | 96 |
| Example Tire 48 | 195/55R20 | 277 | 83.3 | 100 |
| Example Tire 49 | 215/50R21 | 250 | 75.0 | 104 |
| Example Tire 50 | 205/55R20 | 263 | 78.7 | 102 |
| Example Tire 51 | 185/45R22 | 285 | 86.7 | 98 |
| Example Tire 52 | 155/65R13 | 220 | 90 | 91 |

According to the test results shown in Table 2, and FIGS. 4 and 5, the inventors have discovered the followings. In a radial tire with a size where SW/OD is 0.26 or less when the tire section width SW is less than 165 mm, while the section width SW and the outer diameter OD of the tire satisfy a relationship formula OD≥2.135×SW+282.3 (hereinafter, also referred to as "Relationship Formula 1 is satisfied") when SW is 165 mm or larger, the air resistance value (Cd value) and the rolling resistance value (RR value) of the vehicle are both reduced in a compatible manner as compared to Reference Tire 1 as a conventional tire in a tire size of 195/65R15.

FIG. 4A shows a boundary (linear equations fitted to the border line) separating tires having an effect of reducing both the rolling resistance value (RR value) of the tire and the air resistance value (Cd value) of the vehicle, from tires that have insufficient effects thereof; the border line represents OD=(1/0.26)×SW in a range of SW<165 mm; and the border line represents OD=2.135×SW+282.3 in a range of SW≥165.

Further, according to the test results shown in Table 2, and FIG. 4B and FIG. 5, the inventors have discovered the followings. In radial tires with a size where the section width SW and the outer diameter OD of the tire satisfy a relationship formula OD≥−0.0187×SW$^2$+9.15×SW−380 (hereinafter, also referred to as "Relationship Formula 2 is satisfied") at the tire internal pressure of at least 250 kPa, the air resistance value (Cd value) and the rolling resistance value (RR value) of the vehicle are both reduced in a compatible manner as compared to Reference Tire 1 as a conventional tire with a size of 195/65R15.

FIG. 4B shows a boundary (quadratic curve fitted to the border line) separating tires showing the effects of reducing both the rolling resistance value (RR value) of the tire and the air resistance value (Cd value) of the vehicle, from tires that are insufficient in those effects; the border line is a curve representing OD=−0.0187×SW$^2$+9.15×SW−380.

The inventors have also found out that the aforementioned effects can easily be obtained in Example Tires 1 to 7 and 17 satisfying SW/OD≤0.24 as shown in Table 2, and FIGS. 4 and 5.

Next, Example Tires 1 to 18 in particular are subjected to the following tests in order to evaluate the fuel consumption and comfortability of the vehicle.

<Actual Fuel Consumption>

The tires were tested by JOC8 mode running. The evaluation results are shown as index values relative to "100" of Reference Tire 1. The larger index value represents the more excellent fuel consumption.

<Comfortability>

The tires were each mounted onto a vehicle having a width of 1.7 m, and the rear trunk width thereof was measured. The evaluation results are shown as index values relative to "100" obtained as the evaluation result for Reference Tire 1. The large index value represents the more excellent comfortability.

The test results are shown in Table 3 below.

TABLE 3

| | Relationship Formula (1) | Relationship Formula (2) | Actual Fuel Consumption | Comfortability |
|---|---|---|---|---|
| Example Tire 1 | satisfied | satisfied | 117 | 105 |
| Example Tire 2 | satisfied | satisfied | 119 | 104 |
| Example Tire 3 | satisfied | satisfied | 105 | 105 |
| Example Tire 4 | satisfied | satisfied | 107 | 105 |
| Example Tire 5 | satisfied | satisfied | 112 | 104 |
| Example Tire 6 | satisfied | satisfied | 114 | 104 |
| Example Tire 7 | satisfied | satisfied | 116 | 104 |
| Example Tire 8 | unsatisfied | unsatisfied | 100 | 104 |
| Example Tire 9 | unsatisfied | unsatisfied | 101 | 102 |
| Example Tire 10 | unsatisfied | unsatisfied | 106 | 101 |
| Example Tire 11 | unsatisfied | satisfied | 109 | 100 |
| Example Tire 12 | satisfied | satisfied | 112 | 99 |
| Example Tire 13 | unsatisfied | unsatisfied | 97 | 101 |
| Example Tire 14 | unsatisfied | unsatisfied | 101 | 99 |
| Example Tire 15 | unsatisfied | unsatisfied | 103 | 98 |
| Example Tire 16 | unsatisfied | unsatisfied | 106 | 97 |
| Example Tire 17 | satisfied | satisfied | 116 | 105 |
| Example Tire 18 | unsatisfied | unsatisfied | 99 | 99 |
| Reference Tire 1 | — | — | 100 | 100 |

As shown in Table 3, some of Example Tires failing to satisfy the relationship formulae (1) and/or (2) above (see FIG. 4) were found to be deteriorated than Reference Tire 1 in at least one of fuel consumption and comfortability, while Example Tires 1 to 7, 12, and 17 satisfying the relationship formulae (1) and/or (2) above (see FIG. 4) were all found to be more excellent than Reference Tire 1 in both fuel consumption and comfortability.

As a result of the tests performed as described above, the inventors have discovered that a pneumatic radial tire having a section width SW and an outer diameter OD satisfying the relationship formulae (1) and/or (2) above is capable of reducing both the air resistance value of the vehicle and the rolling resistance value of the tire while improving comfortability of the vehicle, and further, capable of improving fuel consumption while improving comfortability of the vehicle.

Next, description is given of structures of a pneumatic radial tire in which the section width SW and the outer diameter OD satisfy the relationship formulae (1) and/or (2) above.

FIGS. 6A to 6D each are a development view illustrating a tread pattern of a tire according to an embodiment of the present invention.

As illustrated in FIGS. 6A to 6D, the tire of the present invention has one or more grooves 2 formed in a tread surface 1.

Figure 7A:
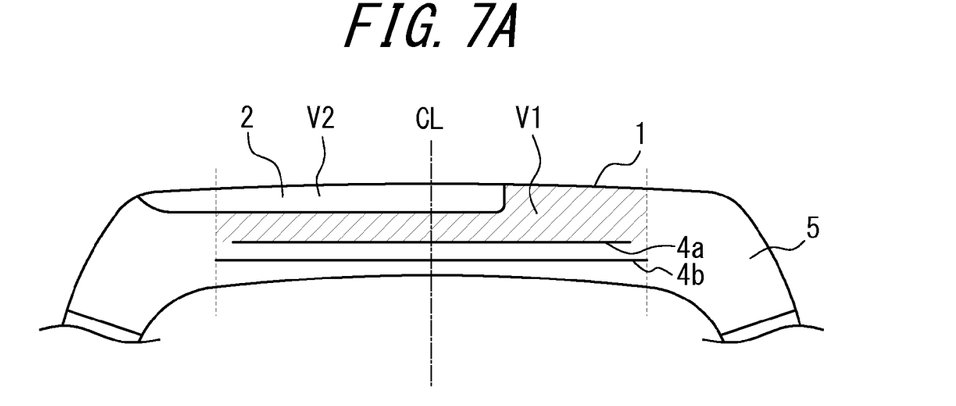
FIG. 7 is a schematic sectional view in the tire width direction for illustrating the ratio δg/δt.

Further, as illustrated in FIG. 7A, the tire of the present invention includes one or more belt layers (two layers in the drawing) 4a, 4b, and a tread 5, which are disposed in this order on the outside in the radial direction of the carcass.

Further, a volume of rubber that is shaded in FIG. 7A is designated as V1, the volume of rubber lying inside in the tire width direction than the both ends in the width direction of the maximum-width belt layer 4b which has a maximum width in the tire width direction among the belt layers, while lying outside in the tire radial direction than the reinforcing member 4a which is the outermost layer of the belt layers in the tire radial direction at the center position in the tire width direction (tire equator plane CL).

Figure 7B:
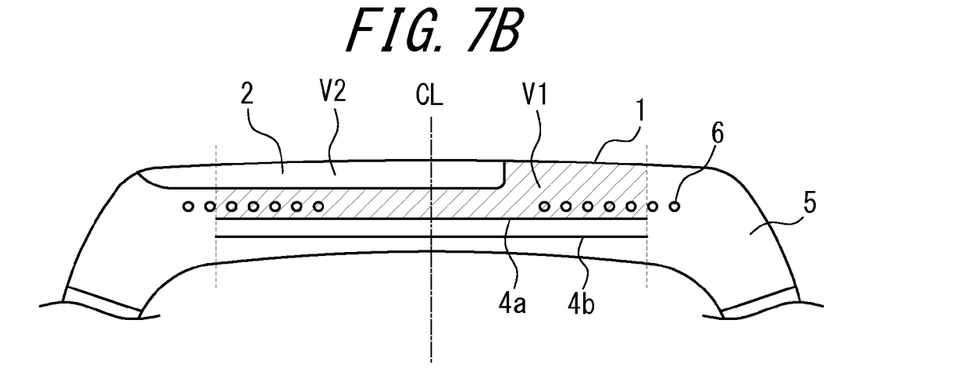

Here, as illustrated in FIG. 7B, for example, in a tire having a belt reinforcing layer 6 partially disposed on the outside portion in the tread width direction on the outside in the radial direction of the belt, V1 designates a volume of rubber shaded in FIG. 7B, the rubber lying inside in the width direction than the maximum-width belt layer 4b while lying outside in the tire radial direction than the belt layer 4a serving as an outermost reinforcing member in the tire radial direction at the center position in the tire width direction.

Further, the total volume of all the grooves 2 formed in the tread surface 1 (the sum of the volumes of all the grooves) is designated as V2.

Here, the reinforcing member corresponds to a belt or a belt protection layer.

Further, the tread surface refers to a surface region of a tread rubber, the region coming into contact with a flat plate when the tire assembled with an applicable rim and inflated at an internal pressure defined for each vehicle onto which the tire is to be mounted is vertically placed on the flat plate under a load of weight that corresponds to a maximum load prescribed for each vehicle onto which the tire is to be mounted.

In the present invention, the "applicable rim" refers to a rim prescribed in accordance with a tire by an industrial standard valid in the area where the tire is produced and used and examples of the industrial standard include: JATMA (The Japan Automobile Tyre Manufacturers Association, Inc.) YEAR BOOK in Japan; ETRTO (European Tyre and Rim Technical Organisation) STANDARD MANUAL in Europe; and TRA (THE TIRE and RIM ASSOCIATION INC.) YEAR BOOK in the United States. Further, the "maximum air pressure" is determined according to an applicable rim corresponding to the size of a radial ply tire and a table of air pressure vs. loading capacity prescribed by JATMA YEAR BOOK and the like. Still further, the "weight that corresponds to a maximum load" represents the maximum load allowed to be exerted on a single tire (the maximum loading capacity of a single tire) in an application size prescribed in the predetermined industrial standards described above.

At this time, according to the present invention, it is essential that the section width SW and the outer diameter OD of the tire satisfy the above relationship formulae (1) and/or (2), and the above ratio V2/V1 is 20% or less.

The operation and effect of the present invention is described in below.

Figure 1B:
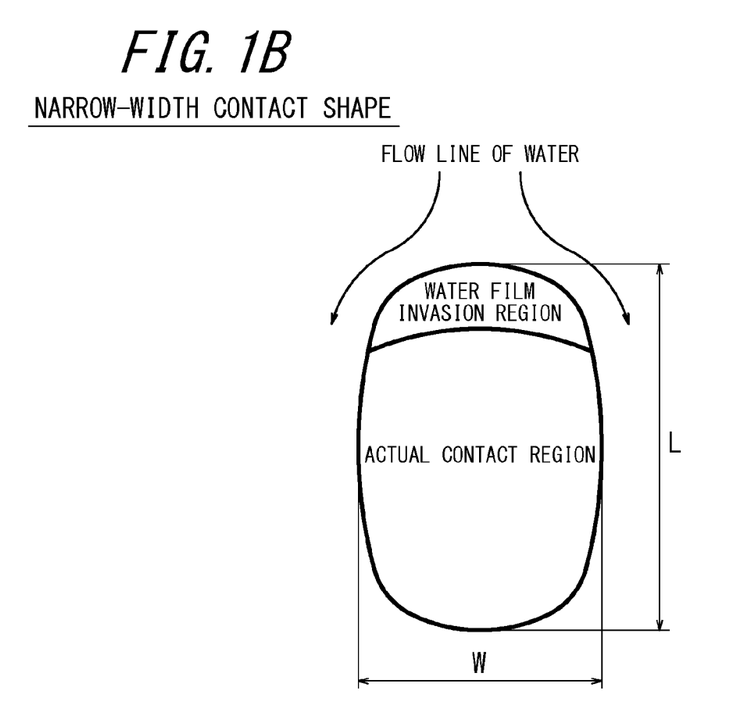
FIG. 1B is a view for illustrating the wet performance of a narrow-width radial tire.

According to the present invention, first, SW and OD satisfy the above relationship formulae (1) and/or (2), which means that the treading surface is small in width, and thus, water is likely to be discharged in the width direction both sides of the tire on a wet road surface, as illustrated in FIG. 1B schematically showing the flow line of the water by an arrow. Accordingly, even if the groove volume is reduced to be in the aforementioned range, the drainage performance can still be ensured and thus an actual contact area can be sufficiently ensured, with the result that wet braking performance is improved.

On the other hand, as to the driving performance on a dry road surface, the groove volume is small enough to fall within the aforementioned range and the land portion has high rigidity, which can ensure cornering power and wear resistance.

Further, as described above, the groove volume can be reduced to small, which also allows for reduction in volume of the tread rubber, to thereby reduce the weight of the tire so as to alleviate the rolling resistance value.

Therefore, according to the present invention, the low fuel consumption can be attained while ensuring low fuel consumption and a free space in the vehicle, and further, the driving performance can be ensured both on a dry road surface and on a wet road surface in a compatible manner.

Further, the negative ratio (the ratio of a groove area relative to the area of the tread surface) on the tread surface 1 is preferably 20% or less.

The reason is as follows. As described above, the tire of the present invention, in which SW and OD satisfy the above relationship formulae (1) and/or (2), is high in drainage performance so as to ensure sufficient drainage performance even if the negative ratio is defined to be in the aforementioned range, while the land portion can be enhanced in rigidity to thereby improve cornering power and wear resistance.

Further, the tread rubber can be reduced in volume for the amount by which the groove area is reduced, to thereby ensure the reduction in weight and rolling resistance value of the tire.

On the other hand, in order to further ensure the drainage performance, the negative ratio is preferably 10% or more.

Figure 8:
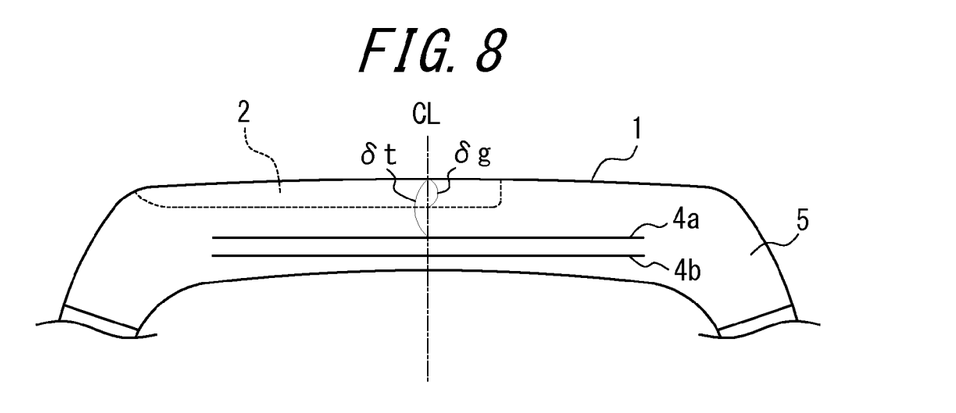
FIG. 8 is a view for illustrating the (a) to (b) ratio, V2/V1.

Further, as illustrated in FIG. 8, $\delta g$ representing the groove depth of the groove 2 and $\delta t$ representing the thickness of the tread rubber 5, the thickness of the tread rubber 5 being a distance from the tread surface 1 to the reinforcing member on the outermost side in the tire radial direction (the outermost belt layer 4a of the two belt layers 4a, 4b as exemplified in the drawing), preferably satisfy the relation: $\delta g/\delta t \leq 0.85$.

The reason is that the aforementioned ratio δg/δt defined to be 0.85 or less can further ensure the rigidity of the land portion, which allows for improvement in driving performance on a dry road surface.

Further, in consideration of the balance between ensuring a necessary volume of grooves for discharging water and the wear resistance, the ratio preferably satisfies the relation: δg/δ≥0.65.

More specifically, the thickness 8t of the tread rubber 5 is preferably 8 mm or less, because the tire can be reduced in weight to thereby further alleviate the rolling resistance value.

On the other hand, in order to ensure a groove height sufficient enough to retain wet performance even after a certain degree of wear has developed, the thickness 8t of the tread rubber is preferably at least 5 mm.

In addition, the tire of the present invention is preferably used at an internal pressure of at least 250 kPa.

The reason is that the high internal pressure can increase the belt tension, which can improve, along with the increase in contact pressure, hydroplaning performance.

Further, the tire is preferably used at an internal pressure of 350 kPa or less.

Here, the tire of the present invention preferably has an air volume of at least 15000 cm$^3$, which is necessary to retain a minimum load capacity of the tire.

EXAMPLES

In order to ascertain the effect of the present invention, tires according to Inventive Examples 1 to 3 were prototyped while tires according to Conventional Examples 1, 2 were prepared.

Each tire was subjected to the following tests to evaluate the tire performance.

<Wet Braking Performance>

Vehicles mounted with the aforementioned tires were each driven on a wet road surface at an initial speed of 40 km/h, and the stopping distance (mm) at full brake was indexed for evaluation.

In the evaluation, the distances are shown as index values relative to "100" of the performance of a tire according to Conventional Example 1. The larger index value represents the more excellent performance.

<Cornering Power>

Cornering power was measured using a flat belt type cornering test machine.

The cornering power was evaluated as index values relative to "100" of the cornering power in a tire according to Conventional Example 1. The larger index value is preferred because it indicates the larger cornering power.

<Wear Resistance>

The remaining amount of grooves after driving of 100,000 kilometers was measured so as to calculate the wear amount. A wear resistance was evaluated as index values relative to "100" of the wear resistance evaluated for a tire according to Conventional Example 1. The larger value indicates the more excellent wear resistance.

<Tire Weight>

The tire weight was measured. The tire weight was evaluated as index value relative to "100" of the weight of a tire according to Conventional Example 1. The smaller value indicates that the tire is lighter in weight.

<Rolling Resistance Value>

Rolling resistance was measured by: assembling each of the aforementioned test tires with a rim to obtain a tire-rim assembly; applying on the tire-rim assembly the maximum load prescribed for a vehicle on which the tire is mounted; and running the tire at drum rotation speed of 100 km/h.

The evaluation results are shown as index values relative to "100" of a tire according to Conventional Example 1 having an ordinary negative ratio. The smaller index value represents the smaller rolling resistance.

The relevant specifications and the evaluation results for each of the tires are shown in Table 4. Other specifications of each tire than those shown in Table 4 (e.g. internal structures thereof) are the same as those of a tire commonly in use.

TABLE 4

|  | Inventive Example 1 | Inventive Example 2 | Inventive Example 3 |
|---|---|---|---|
| Tire Size | 155/55R19 | 155/45R18 | 175/65R17 |
| SW (mm) | 155 | 155 | 175 |
| OD (mm) | 653.1 | 627.7 | 659.3 |
| Relationship Formula (1) | satisfied | satisfied | satisfied |
| Relationship Formula (2) | satisfied | satisfied | satisfied |
| SW/OD | 0.24 | 0.26 | 0.27 |
| V2/V1(%) | 16 | 16 | 16 |
| Negative Ratio (%) | 18 | 18 | 18 |
| Tread Thickness δt (mm) | 9 | 9 | 9 |
| Groove Depth δg (mm) | 8 | 8 | 8 |
| δg/δt | 0.875 | 0.875 | 0.875 |
| Wet Braking Performance | 120 | 118 | 118 |
| Cornering Power | 115 | 114 | 112 |
| Wear Resistance | 118 | 116 | 118 |
| Tire Weight | 86 | 82 | 88 |
| Rolling Resistance | 60 | 61 | 61 |

|  | Inventive Example 4 | Inventive Example 5 | Conventional Example 1 | Conventional Example 2 |
|---|---|---|---|---|
| Tire Size | 155/55R19 | 155/55R19 | 205/55R16 | 205/55R16 |
| SW (mm) | 155 | 155 | 205 | 205 |
| OD (mm) | 653.1 | 653.1 | 631.9 | 631.9 |
| Relationship Formula (1) | satisfied | satisfied | unsatisfied | unsatisfied |
| Relationship Formula (2) | satisfied | satisfied | unsatisfied | unsatisfied |
| SW/OD | 0.24 | 0.24 | 0.32 | 0.32 |

TABLE 4-continued

| | | | | |
|---|---|---|---|---|
| V2/V1(%) | 15 | 15 | 26.3 | 26.3 |
| Negative Ratio (%) | 18 | 20 | 30 | 30 |
| Tread Thickness δt (mm) | 6 | 6 | 9 | 6 |
| Groove Depth δg (mm) | 5 | 5 | 8 | 5 |
| δg/δt | 0.833 | 0.833 | 0.875 | 0.833 |
| Wet Braking Performance | 105 | 106 | 100 | 82 |
| Cornering Power | 126 | 123 | 100 | 110 |
| Wear Resistance | 70 | 60 | 100 | 53 |
| Tire Weight | 81 | 79 | 100 | 95 |
| Rolling Resistance Value | 57 | 58 | 100 | 95 |

As shown in Table 4, the comparison of Inventive Examples 1, 2, 3, 4, 5 with Conventional Examples 1, 2 shows that Inventive Examples 1, 2, 3, 4, 5 in which SW and OD satisfy the above relationship formulae (1) and/or (2) and V2/V1 is optimized are each more excellent than Conventional Examples 1, 2 in wet braking performance, cornering power, and wear resistance while being lighter in tire weight and smaller in rolling resistance value. Further, Inventive Examples 1, 2, 3, 4, 5, in which the negative ratio is also optimized, are more excellent than Conventional Examples 1, 2 in wet braking performance, cornering power, and wear resistance while being lighter in tire weight and significantly smaller in rolling resistance value.

Further, as shown in Table 4, the comparison of Inventive Example 1 with Inventive Examples 4, 5 shows that Inventive Examples 4, 5 in which the above ratio δg/δt is optimized are lighter in tire weight and further reduced in rolling resistance.

Meanwhile, Conventional Example 2 having a thin rubber gauge is lighter in tire weight, but the rest of the properties are deteriorated.

Next, in order to investigate the effect of increasing the internal pressure of the tire in use, Example Tire 17 was varied in internal pressure thereof, and tested for tire performance.

The relevant specifications of the tires and the evaluation results are shown in Table 5 below. Other specifications of each tire than those shown in Table 5 (e.g. internal structures thereof) were the same as those of a tire commonly in use. Further, in Table 5, the evaluation results are shown as index values relative to "100" that is obtained for Example Tire 17 at an internal pressure of 250 kPa. The larger value represents the more excellent properties.

TABLE 5

| | Example Tire 17 | Example Tire 17 |
|---|---|---|
| Internal Pressure (kPa) | 220 | 250 |
| RR Value | 90 | 100 |
| Wet Braking Performance | 95 | 100 |

It can be appreciated from Table 5 that the use of a tire with an optimized internal pressure is capable of reducing the rolling resistance value while improving wet braking performance.

REFERENCE SIGNS LIST

1 tread surface
2 groove
3 land portion
4a, 4b belt layer
5 tread rubber
6 belt reinforcing layer

The invention claimed is:

1. A passenger vehicle pneumatic radial tire, having a carcass constituted of plies as radially-disposed cords and toroidally provided across a pair of bead portions, and including: a belt constituted of one or more belt layers; and a tread, which are disposed in this order on the outside in the radial direction of the carcass, wherein, provided that SW and OD each represent a section width and an outer diameter of the tire, respectively, SW and OD satisfy:
   i) a ratio SW/OD≤0.26; and
   ii) 145 (mm) ≤SW<165 (mm),
   wherein, provided that V1 represents a volume of rubber lying inside in the tire width direction than the both ends in the width direction of a maximum-width belt layer having a maximum width in the tire width direction among the belt layers while lying outside in the tire radial direction than a reinforcing member which is the outermost layer of the belt layers in the tire radial direction at the center position in the tire width direction, and that V2 represents a total volume of all the grooves formed in a surface of the tread, the ratio V2/V1 is 20% of less, wherein an aspect ratio of the passenger vehicle pneumatic radial tire is greater than or equal to 45 and less than 70,
   provided that D represents a rim diameter of the tire, SW and D satisfy:

SW/D>0.3, wherein the rim diameter of the tire is greater than or equal to 457.2 mm and less than or equal to 482.6 mm. and
   wherein the outer diameter of the tire is greater than or equal to 653.1 mm and less than or equal to 671.1 mm.

2. The tire-rim assembly according to claim 1, wherein a tread surface has a negative ratio of 20% or less.

3. The tire-rim assembly according to claim 1, wherein, provided that δg represents a groove depth of a groove in a tire equator plane and δt represents a thickness of tread rubber in the tire equator plane from a tread surface to the reinforcing member on the outermost side in the tire radial direction, δg and δt satisfy δg/δt≤0.85.

4. The tire-rim assembly according to claim 1, wherein the ratio SW/OD is 0.24 or less.

5. The tire-rim assembly according to claim 1, wherein the passenger vehicle pneumatic radial tire is a tubeless tire.

6. The passenger vehicle pneumatic radial tire according to claim 1, wherein the aspect ratio of the passenger vehicle pneumatic radial tire is greater than or equal to 50 and less than 70.

7. A passenger vehicle pneumatic radial tie, having a carcass constituted of plies as radially-disposed cords and toroidally provided across the pair of bead portions, and including: a belt constituted of one or more belt layers; and a tread, which are disposed in this order on the outside in a radial direction of the carcass, wherein, provided that SW and OD each represent a section width and an outer diameter of the tire, respectively, SW and OD satisfy:
i) a relationship formula OD≥2.135×SW+282.3;
ii) SW≥165 (mm),
wherein, provided that V1 represents a volume of rubber lying inside in a tire width direction than both ends in a width direction of a maximum-width belt layer having a maximum width in the tire width direction among the belt layers while lying outside in a tire radial direction than a reinforcing member which is the outermost layer of the belt layers in the tire radial direction at a center position in the tire width direction, and that V2 represents a total volume of all grooves formed in a surface of the tread, a ratio V2/V1 is 20% of less,
wherein an aspect ratio of the passenger vehicle pneumatic radial tire is greater than or equal to 45 and less than or equal to 70,
provided that D represents a rim diameter of the tire, SW and D satisfy:

SW/D≤0.3, wherein the rim diameter of the tire is greater than or equal to 457.2 mm and less than or equal to 558.8 mm, and
wherein the outer diameter of the tire is greater than or equal to 638.7 mm and less than or equal to 751.3 mm.

8. The tire-rim assembly according to claim 7, wherein a tread surface has a negative ratio of 20% or less.

9. The tire-rim assembly according to claim 7,
wherein, provided that $\delta g$ represents a groove depth of a groove in a tire equator plane and $\delta t$ represents a thickness of tread rubber in the tire equator plane from a tread surface to the reinforcing member on the outermost side in the tire radial direction, $\delta g$ and $\delta t$ satisfy $\delta g/\delta t \leq 0.85$.

10. The tire-rim assembly according to claim 7, wherein the passenger vehicle pneumatic radial tire is a tubeless tire.

11. The passenger vehicle pneumatic radial tire according to claim 7, wherein the aspect ratio of the passenger vehicle pneumatic radial tire is greater than or equal to 50 and less than 70.

12. A passenger vehicle pneumatic radial tire, having a carcass constituted of plies as radially-disposed cords and toroidally provided across a pair of bead portions, and including: a belt constituted of one or more belt layers; and a tread, which are disposed in this order on the outside in the radial direction of the carcass, wherein, provided that SW and OD each represent a section width and an outer diameter of the tire, respectively, SW and OD satisfy:
i) a ratio SW/OD≤0.26; and
ii) 145 (mm)≤SW<165 (mm),
wherein, provided that V1 represents a volume of rubber lying inside in the tire width direction than the both ends in the width direction of a maximum-width belt layer having a maximum width in the tire width direction among the belt layers while lying outside in the tire radial direction than a reinforcing member which is the outermost layer of the belt layers in the tire radial direction at the center position in the tire width direction, and that V2 represents a total volume of all the grooves formed in a surface of the tread, the ratio V2/V1 is 20% of less, wherein an aspect ratio of the passenger vehicle pneumatic radial tire is greater than or equal to 45 and less than 70,
provided that D represents a rim diameter of the tire, SW and D satisfy:

SW/D>0.3, wherein the rim diameter of the tire is 406.4 mm, and wherein the outer diameter of the tire is 580.4 mm.

13. The passenger vehicle pneumatic radial tire according to claim 12, wherein the tread surface has a negative ratio of 20% or less.

14. The passenger vehicle pneumatic radial tire according to claim 12,
wherein, provided that $\delta g$ represents a groove depth of the groove in a tire equator plane and $\delta t$ represents a thickness of the tread rubber in the tire equator plane from the tread surface to the reinforcing member on the outermost side in the tire radial direction, $\delta g$ and $\delta t$ satisfy $\delta g/\delta t \leq 0.85$.

15. The passenger vehicle pneumatic radial tire according to claim 12, wherein the ratio SW/OD is 0.24 or less.

* * * * *